US012744480B2

(12) United States Patent
Soliman

(10) Patent No.: US 12,744,480 B2
(45) Date of Patent: Sep. 22, 2026

(54) STATE ESTIMATION FOR CONTROLLING A DRIVE MACHINE WITHOUT SENSORS

(71) Applicant: Bayerische Motoren Werke Aktiengesellschaft, Munich (DE)

(72) Inventor: Ahmed Soliman, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 18/265,877

(22) PCT Filed: Jan. 12, 2022

(86) PCT No.: PCT/EP2022/050532
§ 371 (c)(1),
(2) Date: Jun. 7, 2023

(87) PCT Pub. No.: WO2022/161768
PCT Pub. Date: Aug. 4, 2022

(65) Prior Publication Data

US 2024/0030849 A1 Jan. 25, 2024

(30) Foreign Application Priority Data

Jan. 26, 2021 (DE) ..................... 10 2021 101 613.4

(51) Int. Cl.
*H02P 21/14* (2016.01)
*H02P 21/00* (2016.01)
(Continued)

(52) U.S. Cl.
CPC .......... *H02P 21/14* (2013.01); *H02P 21/0003* (2013.01); *H02P 21/13* (2013.01); *H02P 21/28* (2016.02)

(58) Field of Classification Search
CPC ...... H02P 21/14; H02P 21/0003; H02P 21/13; H02P 21/28; H02P 21/18; H02P 21/20; H02P 21/24; H02P 21/141
See application file for complete search history.

(56) References Cited

U.S. PATENT DOCUMENTS 10,218,301 B1 2/2019 Wang
2003/0127289 A1 7/2003 Elgas et al.
(Continued)

FOREIGN PATENT DOCUMENTS

CN 108306570 A 7/2018
CN 108900128 A 11/2018
CN 112937545 A * 6/2021 ............ B60W 10/20

OTHER PUBLICATIONS

International Search Report (PCT/ISA/210) issued in PCT Application No. PCT/EP2022/050532 dated May 9, 2022 with English translation (five (5) pages).
(Continued)

*Primary Examiner* — Bickey Dhakal
(74) *Attorney, Agent, or Firm* — Crowell & Moring LLP

(57) ABSTRACT

Methods, apparatuses, and systems are provided for controlling an electrical drive machine. Actuator stator currents of the electrical drive machine are measured. A manifestation of an internal state of the electrical drive machine are estimated based on the measured actuator stator currents. A quality criterion is ascertained for the estimated manifestation of the internal state of the electrical drive machine. The estimated manifestation is forwarded if the quality criterion is satisfied.

12 Claims, 4 Drawing Sheets

(51) Int. Cl.
*H02P 21/13* (2006.01)
*H02P 21/28* (2016.01)

(56) References Cited

U.S. PATENT DOCUMENTS

| | | | | |
|---|---|---|---|---|
| 2011/0068724 | A1 | 3/2011 | Henderson et al. | |
| 2016/0226419 | A1* | 8/2016 | Wang | H02P 21/24 |
| 2019/0280632 | A1 | 9/2019 | Jusuf | |
| 2020/0099323 | A1 | 3/2020 | Luedtke et al. | |

OTHER PUBLICATIONS

German-language Written Opinion (PCT/ISA/237) issued in PCT Application No. PCT/EP2022/050532 dated May 9, 2022 (six (6) pages).
German-language Search Report issued in German Application No. 10 2021 101 613.4 dated Jul. 16, 2021 with English translation (12 pages).
Kubota H. et al., "DSP-Based Speed Adaptive Flux Observer of Induction Motor", IEEE Transactions on Industry Applications, Mar./Apr. 1993, pp. 344-348, vol. 29, No. 2, (5 pages).
Matisko P. et al, "Optimality tests and adaptive Kalman filter", $16^{th}$ IFAC Symposium on System Identification, The International Federation of Automatic Control, Jul. 11-13, 2012, pp. 1523-1528, vol. 45, No. 16, Brussels, Belgium (6 pages).
Chinese-language Office Action issued in Chinese Application No. 202280007537.3 dated Mar. 31, 2026 with English translation (17 pages).
Zedong, Z. et al., "High-Performance Control System for PMSM Based on Extended Kalman Filter", Transactions of China Electrotechnical Society, Oct. 31, 2007, pp. 18-23, vol. 22, No. 10 with English Abstract (7 pages).

* cited by examiner

STATE ESTIMATION FOR CONTROLLING A DRIVE MACHINE WITHOUT SENSORS

BACKGROUND AND SUMMARY OF THE INVENTION

The present subject matter relates to a method for controlling an electrical drive machine of a motor vehicle, and to an electronic control unit for an electrical drive machine of a motor vehicle, and to an electrical machine synchronous machine, for propelling a motor vehicle.

Typical electrical drive machines for motor vehicles comprise a hardware sensor that detects the position and/or speed of the rotor of the drive machine. The hardware sensor is wired directly or indirectly to a socket that is connected one way or the other directly to the electronic control unit, which digitizes, filters and preprocesses the signal and then relays it back to the control algorithm. The hardware sensor uses up valuable installation space, has an undesirable weight and is expensive to purchase.

US 2020/099323 A1 discloses a position determination that is referred to as "sensorless". The solution shown therein involves a load torque required on the rotor of the drive machine being computed only on the basis of vehicle parameters, however.

The load torque calculation and therefore also the position determination in such "sensorless" solutions are highly susceptible to error because no starting point for the control of the load torque, that is to say no ACTUAL load torque, is used in the control.

Against this background, it is an object of the present subject matter to improve control of an electrical drive machine determination of an internal state of the drive machine on which the control is based.

According to one aspect, a method for controlling a speed and an electrical torque of, an electrical drive machine of a motor vehicle, is specified. The method has at least the following method steps, which can be performed in the indicated order or in a different order that is meaningful to a person skilled in the art:

(i) measuring the ACTUAL stator currents of the drive machine repeatedly at a, preferably constant, sampling frequency, which is in particular in the region of more than 20 or 50 Hz (hertz). An ACTUAL stator current should be understood in the present case to mean in particular a current that is present on one of the three, phases of the drive machine at a sampling time.

(ii) estimating an internal state of the drive machine, the internal state being defined in particular and optionally inter alia by way of parameters such as in particular the stator currents and/or a manifestation of the rotor speed and/or a manifestation of the rotor position and/or a manifestation of the magnetic flux and/or a manifestation of the load torque of the drive machine. The estimation is performed on the basis of the measured ACTUAL stator currents, which were measured in particular at the sampling time, the estimation being performed in particular for the sampling time and/or for a subsequent sampling time.

(iv) according to one example, forwarding the estimated internal state of the drive machine to an actuation means a desired-current controller, of the drive machine if a quality criterion is sufficiently, satisfied.

This allows—even without an angle and/or rotation rate sensor for the position and/or the rotation speed of the rotor—reliable ascertainment of the internal state of the drive machine to be achieved (by way of the estimation).

According to one example, the estimated internal state of the drive machine is forwarded only when it appears expedient for improved control of the drive machine, on the basis of the following method steps:

(iii) ascertaining that a quality criterion is satisfied for the estimated manifestation of the internal state of the drive machine, (iv*) forwarding the estimated internal state of the drive machine only, and/or without additional "flagging", when the quality criterion is satisfied for a measure of quality that is ascertained as being sufficient.

This allows a statement about whether the estimated manifestations of the internal state of the drive machine should be easily used for actuating the latter or whether there optionally needs to be provision for additional collateral in the actuation of the drive machine in order to intercept any estimation errors. If the quality criterion is not satisfied, there may optionally also be provision for the estimated manifestation of the internal state of the drive machine not to be forwarded for a further use.

According to one example, (v) ACTUAL stator currents of the drive machine are actuated on the basis of the forwarded internal state of the drive machine.

According to another aspect, an electronic control unit for an electrical drive machine of a motor vehicle for controlling a speed and an electrical torque (in particular the torque that is needed in order to apply a desired load torque using the electrical machine) of an electrical three-phase, machine, using an three-phase, inverter.

The electronic control unit and in particular the computing means thereof are configured to carry out a method according to one example of the present subject matter, and comprises:

(a) according to one example, means for detecting a load requirement during the operation of the drive machine; (b) means for determining measuring, ACTUAL stator currents suitable sensors and/or an operating model of an inverter of the drive machine; (c) estimating means for determining manifestations of an internal state of the drive machine; (d) computing means for determining a respective DESIRED stator current for each of the three, phases of the electrical machine; (e) according to one example, actuation means desired-current controllers, for actuating the DESIRED stator currents.

According to another aspect, an electrical machine a synchronous machine, for propelling a motor vehicle is specified that comprises an electronic control unit according to one example of the present subject matter.

The present subject matter is based inter alia on the consideration that the internal state of the drive machine cannot necessarily be determined only by way of direct or indirect measurements of the rotor position.

The present subject matter is therefore based inter alia on the concept of using a robust adaptive estimating algorithm to estimate the internal state (that is to say in particular variables such as the speed, rotor position, magnetic flux and load torque of the drive machine) while taking into consideration the variances and covariances of these variables.

In the present case, a very robust adaptive estimating method for determining motor speed and therefore the position of the rotor and load torque is described, according to one example using an nonlinear, adaptive observer. The inputs of the observer are at least the three, stator currents of the drive currents. The outputs are: rotor speed, rotor position, magnetic flux and load torque.

The estimation the prediction associated with the estimation, of the internal state of the drive machine is performed in particular using a method that is sensorless in terms of rotor speed and/or rotor position and that is performed in particular using an estimating algorithm (estimator). According to one example, the estimator in this case is an extended (nonlinear) stochastic filter, such as for example a Kalman filter. Nonlinear properties within the drive machine mean that the estimator must be able to observe a nonlinear component.

The internal state of the output values is estimated by performing three steps, for example: measuring the stator currents, estimating the internal state and optionally a plausibility check. The input supplied to the estimator is the three measured stator currents of the three phases of the drive machine. These are used to estimate the four internal variables (i.e. the internal state) of the drive machine (motor speed, position, flux and load torque). According to one example, this involves first mapping and converting the input currents from three to two. Based on these two currents or optionally without this conversion, the further calculations are performed. Additional operating and/or environmental parameters are taken into consideration for the estimation. According to one example, the stator currents are estimated again and compared with the measured currents in order to obtain a statement about the quality/newness of the estimation, with low variances indicating high estimation accuracy. The transfer is made in particular using a covariance matrix. According to one example, this is ascertained using a mean squared error method. This results in uncertainty being reduced. In a further step, the values obtained undergo a plausibility check. This involves the values obtained being compared with the previous values, with the measured values of the stator currents, once again and rated as plausible if they are within a predefined range.

The methods according to examples of the present subject matter prove to be adaptive (as repetition of the method increases, the manifestations of the internal state of the drive machine that are predicted thereby improve and the variance between the measured manifestations and the manifestations predicted by way of the estimation tends to fall). The improved prediction allows the drive machine to be operated with lower vibration.

Carrying out the method without sensors increases reliability compared with hardware solutions and reduces costs, and weight, while more installation space is available.

According to one example, the quality criterion comprises a comparison of the estimated manifestation of the internal state of the drive machine, of the estimated stator currents, with the measured ACTUAL stator currents, which were measured at mutually corresponding sampling times.

The comparison of the measured stator currents with the stator currents determined by way of the estimation facilitates a simple plausibility check that is also significant in regard to the reliability of the state parameters pertaining to the drive machine that are determined exclusively using estimation.

According to one example, the quality criterion takes into consideration a mean squared error and/or a total harmonic distortion of the estimation in order to assess the variance and/or the distortion of the estimation of one or in each case multiple parameters pertaining to the internal state of the drive machine of the estimator. It is thus possible to use acoustic and/or consumption themes in the quality assessment, for example.

According to one example, the estimation involves taking into consideration variances and/or covariances of the internal state of the drive machine of individual parameters pertaining to the internal state, such as in particular the ACTUAL stator currents and the manifestations of the rotor speed, the rotor position, the magnetic flux and/or the load torque of the drive machine. In particular, the variances and/or covariances (I) that depend on the measurement method and/or the sensors used for measuring the ACTUAL stator currents, and/or (II) of a statistical measurement noise for the measurement of the ACTUAL stator currents, and/or (III) of influencing variables influencing the internal state of the drive machine, and/or (IV) of a statistical process noise are taken into consideration. This allows a forecast model (or an estimation model) to be provided that, due to the consideration of variance, facilitates low-error estimations very reliably within few passes, and also a statement about the reliability of the estimation.

According to one example, the internal state of the drive machine is estimated and/or predicted using a nonlinear adaptive observer. This also allows the estimator to reproduce the nonlinear relationships for the operation of the drive machine.

According to one example, the observer is an extension of a nonlinear stochastic filter and is implemented on the basis of a discrete-time, nonlinear state model. The state space equations for the drive machine are $$\dot{X}=AX+BU$$

$$Y=CX+DU$$

The state model is initialized using two covariance matrices Q0 and R0 that reflect the uncertainty of the estimation v(k) and the measurement w(k). Temporal discretization results in:

$$\dot{X}(k+1)=A_dX(k)+B_dU(k)+v(k)$$

$$Y(k)=C_dX(k)+D_dU(k)+w(k)$$

The estimation vector for the four parameters stator current, flux, rotation angular velocity and load torque pertaining to the internal state of the drive machine, which are represented by six variables, is:

$$\hat{X}(k)=[\hat{i}_{s\alpha}(k)\hat{i}_{s\beta}(k)\hat{\Psi}_{r\alpha}(k)\hat{\Psi}_{r\beta}(k)\hat{\omega}_m(k)\hat{T}_L]^T.$$

Alternatively, the matrices can also be resolved using Taylor series developments at the sampling and/or prediction time.

According to one example, the adaptive observer comprises an extended, stochastic filter such as for example a Kalman filter. This facilitates an optimized software implementation of the estimation, which facilitates sufficiently accurate estimation even using the limited computation capacities of control units customary in motor vehicles.

In particular, a discrete-time extended stochastic filter such as for example a Kalman filter is used that is tailored to the sampling times for the measurement of the ACTUAL stator currents.

According to one example, the estimation is performed on the basis of one or more parameters pertaining to an operating state and/or an environmental state of the motor vehicle.

The inclusion of the operating state and/or the environmental state means that the estimation of the internal state is possible on the basis of the operating case.

An operating state of the motor vehicle is intended to be understood to mean in particular that of the drive machine. An environmental state of the motor vehicle is intended to be understood to mean in particular parameters pertaining to surrounding traffic and/or atmospheric influences and/or a road condition.

According to one example, the estimation is repeated for each of a multiplicity of successive sampling times, and the determined manifestations are forwarded as soon as the quality criterion is and/or was satisfied for the first time or more often than a predetermined limit number. This allows the algorithm to be trained quickly, improving the estimation result and the associated prediction of the internal state of the drive machine.

According to one example, a measure of quality is determined for the satisfaction of the quality criterion and/or is stored in an electronic control unit and/or is used for a weighting or a measure of the use of the forwarded internal state of the drive machine. As such, a determined state of the drive machine optionally cannot be transferred to the desired-current controller and the associated control without comment, but rather can be transferred in "flagged" form, and so accompanying measures can optionally be taken to compensate for an acceptable but not completely adequate estimation quality.

According to one example, the method also has the following method steps, which can be performed in the indicated order or in a different order that is meaningful to a person skilled in the art:

(I) determining in each case, an internal state of the drive machine, the internal state being defined in particular and optionally inter alia by way of parameters such as in particular the stator currents and/or a manifestation of the rotor speed and/or a manifestation of the rotor position and/or a manifestation of the magnetic flux and/or a manifestation of the load torque of the drive machine; and/or (II) determining manifestations of one or more parameters pertaining to an operating state and/or an environmental state of the motor vehicle and/or a propulsion requirement of a vehicle driver; and/or (III) determining in each case, an internal DESIRED state of the drive machine on the basis of the determined internal state and/or the determined manifestations of the operating and/or environmental state and/or the determined propulsion requirement; and/or (IV) determining a set of successively actuatable fundamental voltage space vectors, which is designed to transfer the drive machine from the determined internal state to an internal DESIRED state, on the basis of the determined internal state and/or the determined manifestations of the operating and/or environmental state and/or the determined propulsion requirement on the basis of the determined internal state and the DESIRED state on the basis of a difference between the determined state and the DESIRED state; and/or (VI) actuating an inverter of the drive machine using the determined for the determined, set of successively actuatable fundamental voltage space vectors.

The direct specification of the set of successive fundamental voltage space vectors allows PWM (pulse width modulation) of the stator currents using a separate PWM unit to be dispensed with. In addition, this specification permits the drive machine to be driven on a self-selective trajectory beside the desired control and optimization limitations and/or allows the drive machine to be operated with more degrees of freedom for the actuation of the inverter.

According to one example, the set of successively actuatable fundamental voltage space vectors is actuated by directly triggering the power switches of the inverter of the drive machine. This allows hardware to be saved on account of there no longer being a need for a PWM unit and the associated timer.

According to one example, the method step (IV*) determining multiple alternative sets, and/or sets ascertained for successive sampling times, of successively actuatable fundamental voltage space vectors takes place. This allows the drive machine, or the electronic control unit thereof, to optimize the operation of the drive machine, since the provision of multiple sets facilitates selection of better suited sets in the first place.

According to another aspect, an electronic control unit for an electrical drive machine of a motor vehicle for controlling a speed and a load torque of an electrical three-phase, machine, using a three-phase, inverter, is specified.

The electronic control unit is configured to carry out a method according to one example of the present subject matter and comprises: (A) means for determining a load requirement during the operation of the drive machine; (B) according to one example, means for determining ACTUAL stator currents suitable sensors and/or an operating model of an inverter of the drive machine; (C) means for determining manifestations of an internal state of the drive machine; (D) according to one example, computing means for determining sets of successively actuatable fundamental voltage space vectors; (E) actuation means a desired-current controller, for directly triggering the individual power switches of the inverter of the drive machine.

According to another aspect, an electrical machine a synchronous machine, for propelling a motor vehicle is specified that comprises an electronic control unit according to one example of the present subject matter.

According to one example, a predictive model is used to attain a predictive control strategy for an electrical drive machine of a motor vehicle that improves drive performance, inter alia by integrating predefined complex conditions and boundary conditions.

This allows better forecasting and optimization of the dynamic response of the drive machine by providing a usable method for integrating boundary conditions for optimization purposes and also a forecast horizon, in order to be able to react very quickly to volatile and complex variable driving situations for the vehicle.

According to the example, integration of a forecast horizon and direct control of the power switches (half-bridge switches) in the inverter is facilitated without there being provision for a PWM. The control method, which can be performed under the control of sensors or without sensors, has in particular a computation stage and/or a prediction stage and/or an optimization stage and/or an actuation stage for actuating the drive converter without any modulation or at least without any PWM, by virtue of only a finite amount of fundamental voltage vectors being provided and being triggered directly on the power switches.

The PWM method, which requires additional hardware, is thus avoided by using a method that moreover eases prediction of the motor state and thus a predictive control strategy on account of the better integration of a vehicle state and/or environmental state.

According to one example, the drive machine is driven on a self-selective trajectory beside the desired control and optimization limitations and as such favors the motor with more degrees of freedom for operation.

According to one example, the method has the following steps: (V-A) ascertaining a degree of satisfaction of a quality criterion for the determined sets of successively actuatable fundamental voltage space vectors and/or (V-B) taking into consideration at least one selection criterion for the determined sets of successively actuatable fundamental voltage space vectors; (VI-A) actuating the inverter of the drive machine using that determined set of successively actuatable fundamental voltage space vectors that has the best degree of satisfaction of the quality criterion and/or the at least one selection criterion. This facilitates expedient optimization of the operation of the drive machine.

The quality criterion can naturally also be used as one or the only selection criterion. Relevant selection criteria can alternatively be one or more or all of the following, typical "constraints" on motor actuation: number of space vector changes, loading of the drive battery, drive temperature, weather conditions, etc.

According to one example, the quality criterion takes into consideration a cost assessment and/or a switching loss assessment and/or a for the sets of successively actuatable fundamental voltage space vectors. This allows an optimization of consumption to be attained.

According to one example, the quality criterion takes into consideration a mean squared error and/or a measure of an EMC a ripple and/or harmonic loading of the by the sets of successively actuatable fundamental voltage space vectors a total harmonic distortion of the actuated stator currents in the drive machine. This allows the drive machine to be operated more quietly, more reliably and with fewer divergences from the control aim.

According to one example, the set(s) of successively actuatable fundamental voltage space vectors is/are determined by taking into consideration variances and/or covariances of the internal state of the drive machine. This allows randomly occurring variances during generation of the sets to be taken into consideration.

According to one example, the determination of the sets of successively actuatable fundamental voltage space vectors is repeated for each of a multiplicity of successive sampling times for the internal state of the drive machine. A selection is also made regarding whether a set used for actuating the drive machine is replaced by a set that was determined later and/or by a different set that was determined earlier, this selection being made in particular on the basis of the respective degree of satisfaction of the quality criterion. This promotes iterative, continuous optimization of the operation of the drive machine.

Further advantages and opportunities for use of the present subject matter will become apparent from the description that follows in association with the figures.

DETAILED DESCRIPTION

Figure 1:
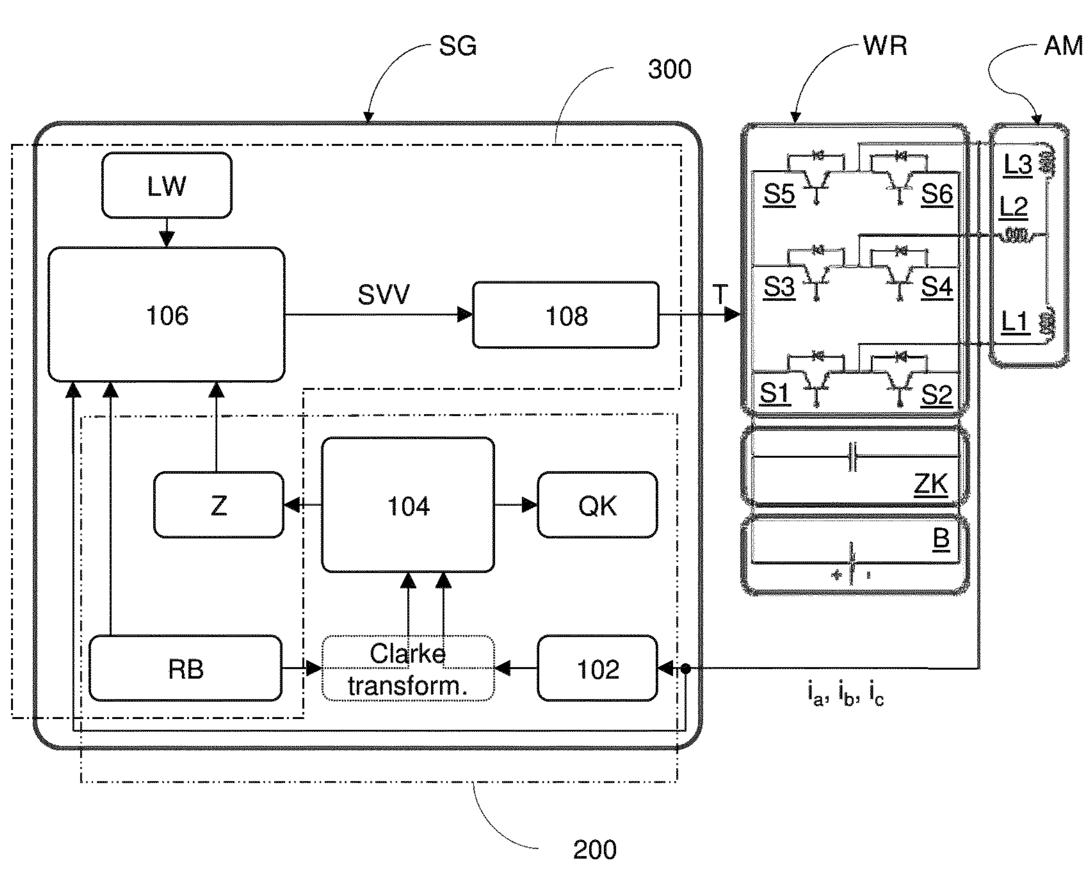
FIG. 1 schematically shows an electrical machine with an electronic control unit according to an illustrative example of the present subject matter.

FIG. 1 shows an electrical drive machine AM for propelling a motor vehicle, not shown, said electrical drive machine being a separately excited three-phase synchronous machine having the phases L1, L2 and L3 in the example. It is irrelevant to the present subject matter and the example described here whether the synchronous machine is in separately or permanently excited form.

A drive battery B connects the machine AM to an energy source via a DC link ZK. The drive machine AM comprises an inverter having six power (half-bridge) switches S1, S2, S3, S4, S5, S6, which can be used to convert the DC voltage provided by the battery B into a three-phase voltage as specified by an electronic control unit SG.

The electronic control unit SG comprises measuring means 102 for measuring ACTUAL stator currents of the individual phases L1, L2 and L3. Furthermore, the electronic control unit comprises estimating means 104 (i.e. estimators) for determining manifestations of an internal state Z of the drive machine AM, computing means 106 for determining a respective DESIRED stator current for each of the phases L of the electrical machine AM, and actuation means 108 (in the example, as desired-current controllers for actuating the DESIRED stator currents). In addition, the electronic control unit SG comprises means for detecting a load requirement LW and/or boundary conditions RB during the operation of the drive machine, or the motor vehicle.

The internal state Z is defined in the example by the stator currents i and manifestations of the rotor angular velocity $\omega$, of the magnetic flux $\Psi$ and of the load torque $T_{load}$ of the drive machine AM.

Figure 2:
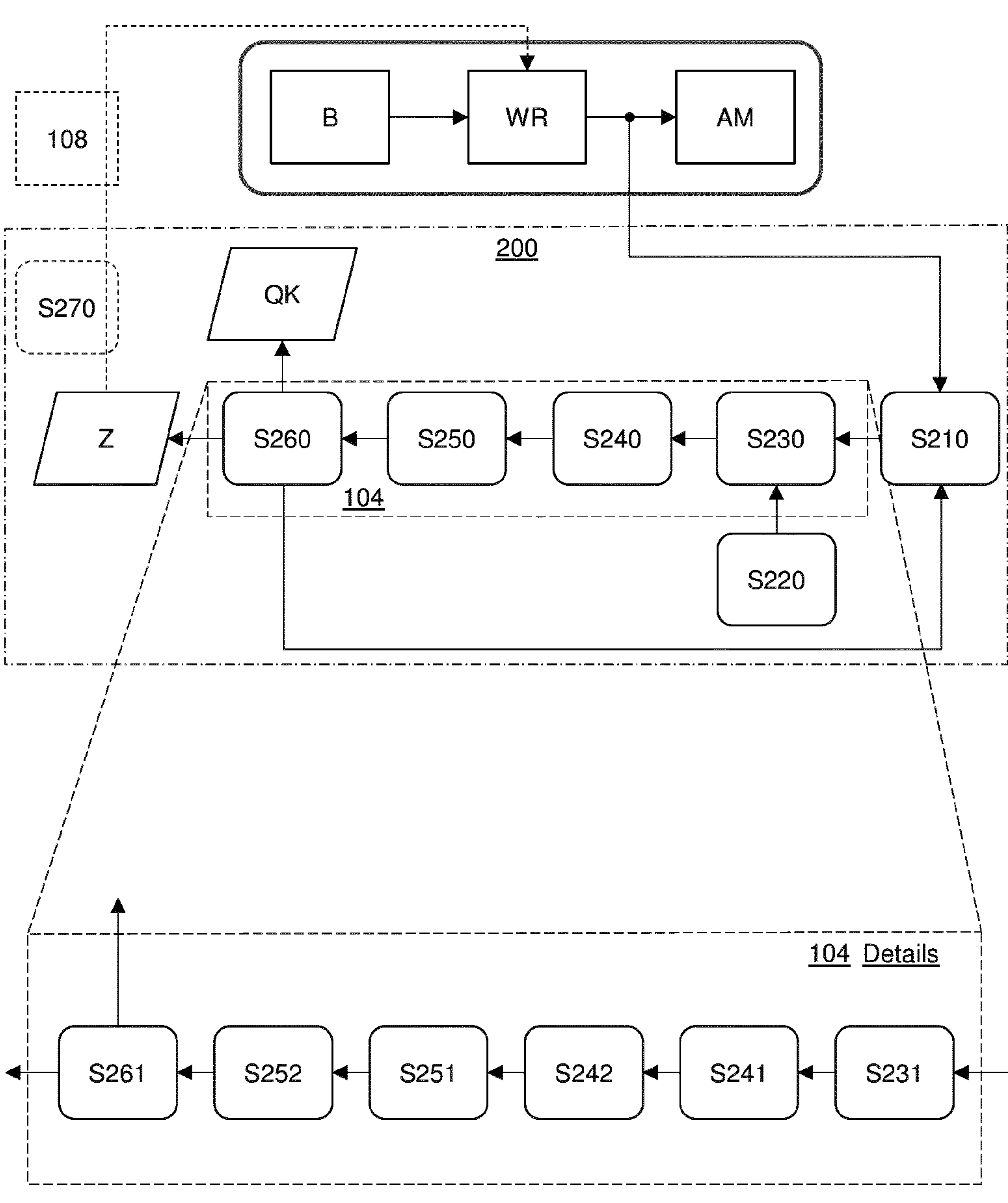
FIG. 2 uses a flowchart to show a method for controlling the electrical drive machine from FIG. 1, the control being performed on the basis of a state estimation for the electrical drive machine.

FIG. 2 uses a flowchart to show an illustrative method 200 for controlling the electrical drive machine AM from FIG. 1, the control being performed on the basis of an estimation of the internal state Z of the electrical drive machine AM.

The illustrative method 200 has the following method steps:

(S210) (in particular repeatedly) measuring the ACTUAL stator currents $i_a$, $i_b$, $i_c$ of the drive machine AM at a constant sampling frequency of for example 200 Hz.

(S220) determining and providing the manifestations of multiple parameters pertaining to an operating state and an environmental state of the motor vehicle (referred to in combination as boundary conditions RB).

(S230) the values ascertained method steps S210 for the stator currents $i_a$, $i_b$, $i_c$ and also the manifestations, associated with the sampling time, of the operating and environmental parameters from method step S220 are preprocessed, discretized and if necessary transformed, for example using a Carke transformation as shown in FIG. 1, in the estimating means 104 (inherently known to those skilled in the art) for subsequent use.

According to one example, this first involves the input currents being reduced from three to two. Based on these two currents, the further calculations are performed. The operating and/or environmental parameters RB from step S220 are taken into consideration for the estimation. The transfer to the estimator 104 is made in particular using a covariance matrix P.

Similarly, this step comprises initializing the estimator 104 with the suitably prepared values $i_A$, $i_B$, $i_C$ for the stator currents and RB for the boundary conditions of the estimation.

(S240) estimating—i.e. forecasting—an internal state Z of the drive machine AM on the basis of the measured ACTUAL stator currents i, which were measured in particular at the sampling time, using the estimator 104.

(S250) correcting the estimator 104 (for the estimation that follows) on the basis of the state Z estimated in S240.

The estimator 104 is in the form of an adaptive, non-linear observer using an extended Kalman filter. In particular, a discrete-time extended Kalman filter is used that is tailored to the sampling times for the measurement of the ACTUAL stator currents. This facilitates an optimized software implementation of the estimation, which also facilitates sufficiently accurate estimation even using the limited computation capacities of control units customary in motor vehicles.

The observer 104 thus comprises a nonlinear extension of a stochastic filter and is implemented on the basis of a discrete-time nonlinear state model. The state space equations for the drive machine AM in this case are $$\dot{X}=AX+BU$$

$$Y=CX+DU$$

The state model is initialized in accordance with step S230 using two covariance matrices $Q_0$ and $R_0$, which reflect the uncertainty of the estimation v(k) and the measurement w(k) (cf. step S231 in the detail representation of the observer 104 in the lower part of FIG. 2). The temporal discretization results in:

$$\dot{X}(k+1)=A_dX(k)+B_dU+v(k)$$

$$Y(k)=C_dX(k)+D_dU(k)+w(k)$$

Here, $A_d$ is the system matrix and $B_d$ is the input matrix. $C_d$ and $D_d$ are the output matrices. These matrices can be resolved using a modified Euler method with the sampling time $T_s$ as follows:

$$A_d=e^{AT_s}\approx I+A*T+1/2*T_s^2*A^2$$

$$B_d\approx T_s*B+1/2*T_s^2*A*B$$

$$C_d=C$$

$$D_d=D$$

I is a 6×6, unit matrix v(k) represents the uncertainties of the system with the covariance matrix $Q_0$ w(k) represents the measurement noise with the covariance matrix $R_0$ The estimation vector $\hat{X}(k)$ for the four parameters stator current i, magnetic flux Ψ, rotor angular velocity ω and load torque $T_{load}$ pertaining to the internal state Z of the drive machine AM, which are represented by six variables, is computed as (cf. step S241 in the detail representation of the observer 104 in the lower part of FIG. 2):

$$\hat{X}(k)=[\hat{i}_{s\alpha}(k)\hat{i}_{s\beta}(k)\hat{\psi}_{r\alpha}(k)\hat{\psi}_{r\beta}(k)\hat{\omega}_m(k)\hat{T}_L]^T.$$

As shown in step S242, a covariance matrix P(k) for the errors is also estimated by $\hat{X}(k)$ and in step S251 the Kalman gain matrix K is estimated to project the residues onto the correction of the system state. In step S252, the output variables Y(k) are computed using the output matrices $C_d$ and $D_d$.

(S260) comparing the state Z estimated in step S240 with the measurement of the stator currents i from step S210 and deducing from the comparison that a quality criterion QK for the estimation is satisfied. The quality criterion takes into consideration a mean squared error MSE and/or a total harmonic distortion THD of the estimation to assess the variance and the distortion of the estimation of the parameters pertaining to the internal state of the drive machine the estimator 104. (cf. step S261 in the detail representation of the observer 104 in the lower part of FIG. 2.)

(S270) forwarding the estimated internal state Z of the drive machine AM to the actuation means 108 if the quality criterion MSE or THD is satisfied. The DESIRED stator currents $i_{desired}$ of the drive machine are then actuated on the basis of the forwarded internal state Z of the drive machine AM.

The estimation of the internal state Z is repeated for each of a multiplicity of successive sampling times, and the determined manifestations are forwarded as soon as an estimation has been selected in respect of all constraints that need to be taken into consideration and/or the quality criterion is satisfied. This allows the algorithm to be trained quickly, improving the estimation result and the associated prediction of the internal state of the drive machine.

This allows reliable determination of the internal state Z of the drive machine to be attained by way of the estimation without an angle and/or rotation rate sensor for the position and/or rotation speed of the rotor.

Figure 3:
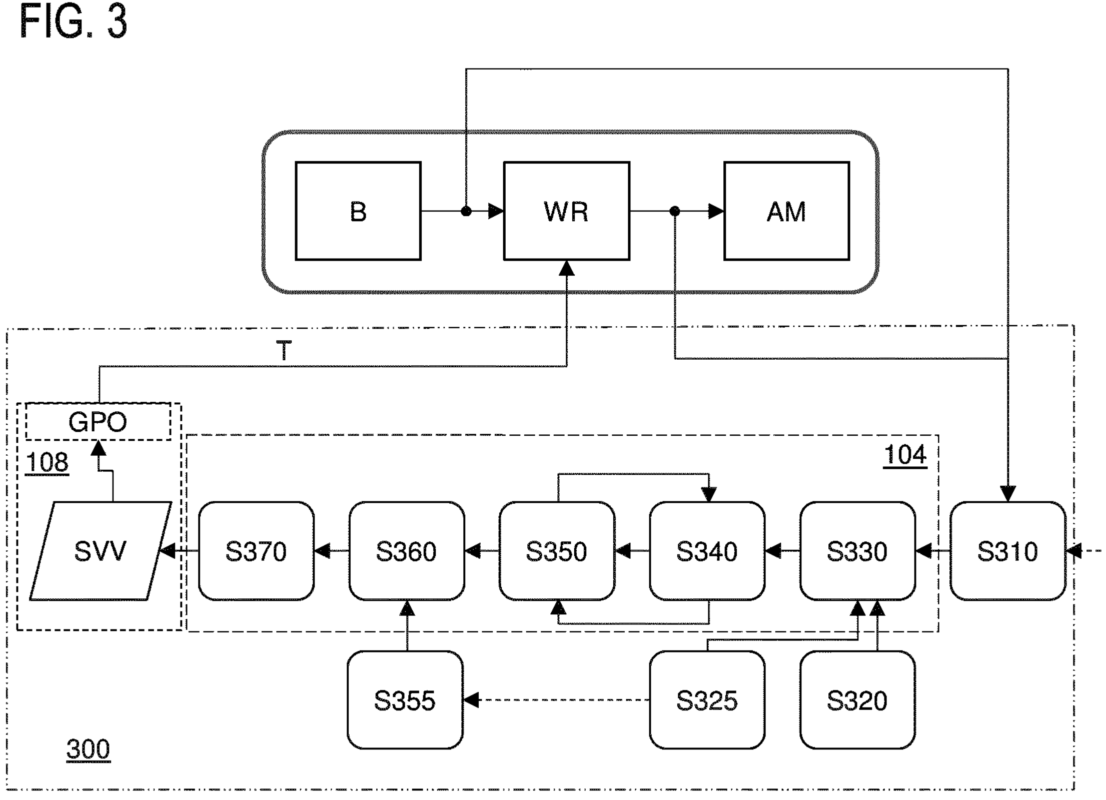
FIG. 3 uses a flowchart to show a further method for controlling the electrical drive machine from FIG. 1, the control being affected on the basis of a direct triggering of the power switches of the inverter of the electrical drive machine.

FIG. 3 uses a flowchart to show a further method 300 for controlling the electrical drive machine AM from FIG. 1, the control being performed on the basis of direct triggers T for the power switches S of the inverter WR of the electrical drive machine AM by way of an actuation means 108.

The illustrative method 300 has the following method steps:

(S310) determining an internal state Z of the drive machine AM. The estimation of the internal state Z of the drive machine AM from the illustrative method 200 shown in FIG. 2 can be used as a starting point or input variables for the method 300. As shown in FIG. 3, measured values from the drive can also be used instead, however.

(S320) determining a propulsion requirement of a vehicle driver and thus a load requirement L compared with the load torque $T_{load}$ (that is to say in particular a load requirement L that leads to a load torque $T_{load}$).

(S325) determining manifestations RB of one or more parameters pertaining to an operating state and an environmental state of the motor vehicle.

(S330) determining an internal DESIRED state of the drive machine AM on the basis of the determined internal state Z and the determined manifestations RB of the operating and environmental states.

(S340/S350) determining multiple alternative sets, and multiple sets ascertained for successive sampling times, SVV of successively actuatable fundamental voltage space vectors V1 to V8, that for transferring the drive machine AM.

To reproduce a three-phase system, a half-bridge is needed for each of the three phases L1, L2, L3 (cf. FIG. 1). Each half-bridge can adopt two different switch positions for the power switches S1 and S2, S3 and S4, S5 and S6. Since three half-bridges are required for a three-phase system, this results in $2^3$ possible switch positions and therefore 8 switching states, which are referred to as fundamental voltage vectors V1 to V8. Each switch position yields a different voltage configuration between the phases L1, L2 and L3 and therefore also a different voltage space vector. The two switch positions for which either all three upper or all three lower switches are closed are an exception. These switch positions result in all three phases L1, L2 and L3 being shorted. It is therefore not possible to measure a voltage between the phases. These two voltage vectors are referred to as zero voltage space vectors. They can be used to represent 6 active and two passive fundamental voltage space vectors V1 to V8.

A suitable sequence of these fundamental voltage vectors V1 to V8 can be used to reliably set a desired torque $T_{load}$ as well as the desired rotor angular velocity ω.

(S355) determining constraints on the actuation of the drive machine, for example and optionally inter alia from the boundary conditions RB and from limits for the motor operation of the drive machine. At least some of the following constraints are taken into consideration in the example: number of space vector changes, loading of the drive battery, drive temperature, weather conditions, etc. The constraints are inherently selected in a manner known to a person skilled in the art.

(S360) taking into consideration at least one selection criterion AK, which is ascertained by a person skilled in the art from the constraints of S335, for the determined sets SVV of successively actuatable fundamental voltage space vectors V when selecting the set SVV to be actuated. The relevant selection criterion in the example may be one or more or all of the following typical "constraints" on motor actuation: number of space vector changes, loading of the drive battery, drive temperature, weather conditions, etc. In the example, the selection criterion AK is used for a "cost" assessment of the sets to be switched and for a switching loss assessment.

(S370) actuating the inverter WR of the drive machine AM by way of the actuation means 108 with the selected set SVV of successively actuatable fundamental voltage space vectors using direct triggers T, which are delivered to GPOs of the actuation means 108 and transferred to the inverter WR.

The selected set SVV of successively actuatable fundamental voltage space vectors V is actuated using direct triggering (i.e. by way of direct triggers T) on interfaces of the power switches of the inverter WR of the drive machine AM. This allows hardware to be saved on account of there no longer being a need for a PWM unit and the associated timer.

The determination of the sets of successively actuatable fundamental voltage space vectors is repeated for each of a multiplicity of successive sampling times for the internal state of the drive machine. A selection is also made regarding whether a set used for actuating the drive machine is replaced by a set that was determined later, this selection being made in particular on the basis of the respective degree of satisfaction of a quality criterion QK. This promotes iterative, continuous optimization of the operation of the drive machine.

Figure 4:
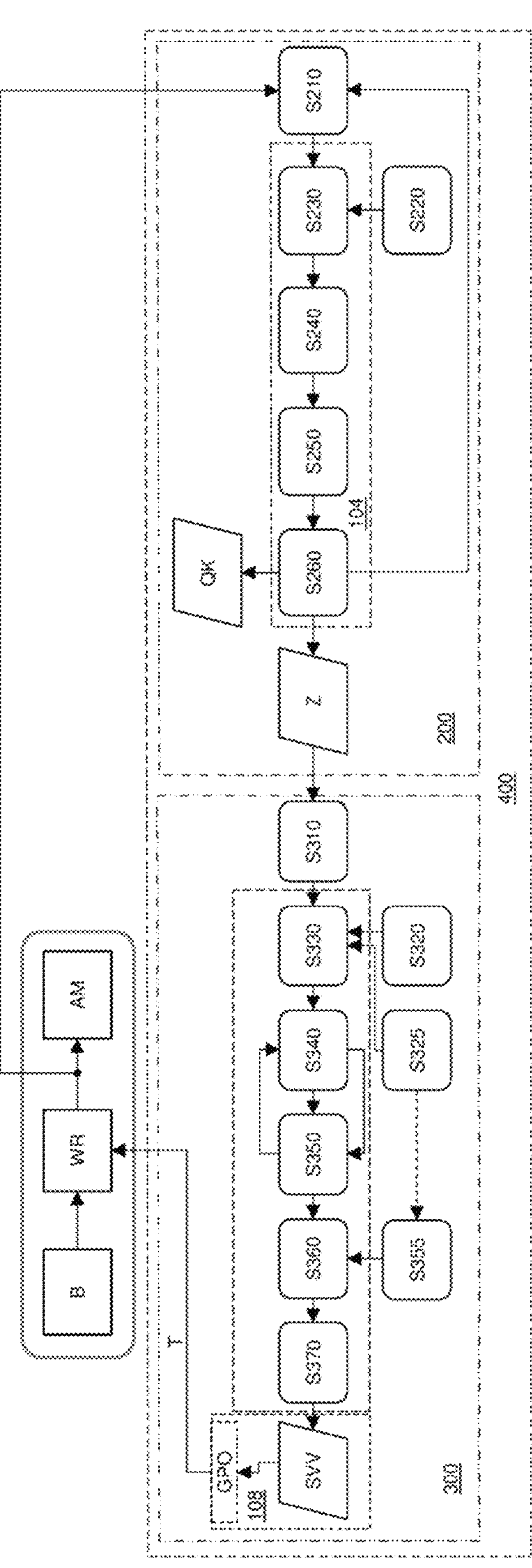
FIG. 4 uses a flowchart to show a further method for controlling the electrical drive machine from FIG. 1, both method steps of the method from FIG. 2 and method steps of the method from FIG. 3 being used.

FIG. 4 uses a flowchart to show a further method 400 for controlling the electrical drive machine from FIG. 1, both method steps of the method 200 from FIG. 2 and method steps of the method 300 from FIG. 3 being used.

The output variables from the method 200 are used as input variables for the method 300.

LIST OF REFERENCE SIGNS

AK selection criterion
AM drive machine
B battery
GPO general purpose output
$I_a$, $I_b$, $I_c$ ACTUAL stator currents of the drive machine
L1, L2, L3 phases of the drive machine
LW load requirement
QK quality criterion
RB boundary conditions (parameters pertaining to an operating and/or environmental state)
SG electronic control unit
S1-S6 power switches of the half-bridges of the inverter
Sxxx method steps
SVV set of fundamental voltage vectors
T direct trigger
WR inverter
Z internal state of the drive machine
ZK DC link
102 measuring means of the electronic control unit for the stator currents of the drive machine
104 estimating means of the electronic control unit (estimator)
106 computing means of the electronic control unit
108 actuation means desired-current controller of the electronic control unit
200 first illustrative method
300 second illustrative method
400 third illustrative method

The invention claimed is:

1. A method for controlling an electrical drive machine of a motor vehicle, comprising:

measuring actual stator currents of the electrical drive machine;

estimating an internal state of the electrical drive machine as an estimated internal state based on the measured actual stator currents;

determining a desired internal state of the electrical drive machine based on the estimated internal state of the electrical drive machine;

determining a plurality of sets of successively actuatable fundamental voltage space vectors for the electrical drive machine, which are ascertained for successive sampling times;

determining constraints on actuation of the electrical drive machine based on boundary conditions of the motor vehicle, which include surrounding traffic, atmospheric influences, and road conditions of the motor vehicle, and based on limits for motor operation of the electrical drive machine;

selecting one of the plurality of sets of successively actuatable fundamental voltage space vectors for the electrical drive machine based on at least one selection criterion, which is determined based on the constraints; and actuating an inverter of the electrical drive machine with the selected set of successively actuatable fundamental voltage space vectors using direct triggers to achieve the desired internal state of the electrical drive machine.

2. The method according to claim 1, further comprising:

ascertaining that a quality criterion is satisfied for the estimated internal state of the electrical drive machine.

3. The method according to claim 2, further comprising:

forwarding the estimated internal state of the electrical drive machine if the quality criterion is satisfied.

4. The method according to claim 2, wherein the quality criterion comprises a comparison of the estimated internal state of the electrical drive machine with the measured actual stator currents.

5. The method according to claim 2, wherein the quality criterion takes into consideration a mean squared error and/or a total harmonic distortion of the estimated internal state in order to assess a variance and/or a distortion of the estimation of one or in each case multiple parameters pertaining to the internal state of the electrical drive machine.

6. The method according to claim 2, wherein the estimation is repeated for each of a multiplicity of successive sampling times, and the estimated internal state is forwarded as soon as the quality criterion is or was satisfied.

7. The method according to claim 2, further comprising:

determining a measure of quality for the satisfaction of the quality criterion.

8. The method according to claim 1, wherein the estimation involves taking into consideration variances and/or covariances of the internal state of the electrical drive machine.

9. The method according to claim 1, wherein the internal state of the electrical drive machine is estimated using a nonlinear adaptive observer.

10. The method according to claim 9, wherein the nonlinear adaptive observer comprises an extended stochastic filter.

11. An electronic control unit for an electrical drive machine of a motor vehicle, comprising:

a sensor for determining actual stator currents of the electrical drive machine; and an estimator for determining an estimated internal state of the electrical drive machine, wherein the electronic control unit is configured to perform the method according to claim 1.

12. An electrical machine for propelling a motor vehicle comprising the electronic control unit of claim 11.

* * * * *